United States Patent
Lee et al.

(10) Patent No.: US 11,168,425 B2
(45) Date of Patent: Nov. 9, 2021

(54) WASHING MACHINE AND METHOD OF CONTROLLING THE SAME

(71) Applicant: LG ELECTRONICS INC., Seoul (KR)

(72) Inventors: Hoonbong Lee, Seoul (KR); Minho Jang, Seoul (KR); Jaegwang Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 222 days.

(21) Appl. No.: 15/718,217

(22) Filed: Sep. 28, 2017

(65) Prior Publication Data

US 2018/0087209 A1  Mar. 29, 2018

(30) Foreign Application Priority Data

Sep. 29, 2016  (KR) .................. 10-2016-0125759

(51) Int. Cl.
*D06F 35/00*  (2006.01)
*D06F 34/18*  (2020.01)
(Continued)

(52) U.S. Cl.
CPC .............. *D06F 34/18* (2020.02); *D06F 23/02* (2013.01); *D06F 33/00* (2013.01); *D06F 34/28* (2020.02);
(Continued)

(58) Field of Classification Search
CPC ...................................................... D06F 9/003
See application file for complete search history.

(56) References Cited

U.S. PATENT DOCUMENTS 9,745,685 B2  8/2017  Jang et al.
2005/0028296 A1  2/2005  Lee et al.
(Continued)

FOREIGN PATENT DOCUMENTS

DE  198 57 903  6/1999
EP  1 995 366  11/2008
(Continued)

OTHER PUBLICATIONS

International Search Report (with English Translation) dated Jan. 19, 2018 issued in Application No. PCT/KR2017/010676.
(Continued)

*Primary Examiner* — Jason Y Ko
(74) *Attorney, Agent, or Firm* — KED & Associates LLP

(57) ABSTRACT

An amount of laundry that is introduced into a washing machine is determined by identifying gravitational and inertia forces applied during the operation of a motor, whereby it is possible to precisely calculate the amount of laundry and to minimize the effects of the initial position of the laundry and the movement of the laundry. In addition, the current value of the motor that is operated is used to measure the amount of laundry without a sensor. Furthermore, the amount of laundry is measured at the rotational speed of the motor at which the laundry clings to the drum, whereby it is possible to minimize error due to the movement of the laundry to thus improve accuracy. Moreover, it is possible to determine the amount of laundry within a short time. Consequently, it is easy to commence the spin-drying operation, thereby reducing washing time and saving energy.

20 Claims, 10 Drawing Sheets

(51) Int. Cl.
*D06F 37/26* (2006.01)
*D06F 39/04* (2006.01)
*D06F 39/08* (2006.01)
*D06F 37/22* (2006.01)
*D06F 39/14* (2006.01)
*D06F 37/06* (2006.01)
*D06F 37/30* (2020.01)
*D06F 37/38* (2006.01)
*D06F 39/02* (2006.01)
*D06F 39/00* (2020.01)
*D06F 23/02* (2006.01)
*D06F 33/00* (2020.01)
*D06F 34/28* (2020.01)

(52) U.S. Cl.
CPC .............. *D06F 37/06* (2013.01); *D06F 37/22* (2013.01); *D06F 37/266* (2013.01); *D06F 37/304* (2013.01); *D06F 37/38* (2013.01); *D06F 39/008* (2013.01); *D06F 39/022* (2013.01); *D06F 39/045* (2013.01); *D06F 39/085* (2013.01); *D06F 39/087* (2013.01); *D06F 39/088* (2013.01); *D06F 39/14* (2013.01); *D06F 2202/04* (2013.01); *D06F 2202/065* (2013.01); *D06F 2202/085* (2013.01); *D06F 2202/12* (2013.01); *D06F 2204/065* (2013.01); *D06F 2204/084* (2013.01); *D06F 2204/088* (2013.01); *D06F 2222/00* (2013.01)

(56) References Cited

U.S. PATENT DOCUMENTS

| | | |
|---|---|---|
| 2005/0028299 A1 | 2/2005 | Jeon et al. |
| 2012/0005840 A1 | 1/2012 | Jang et al. |
| 2012/0324654 A1 | 12/2012 | Koo et al. |
| 2014/0101865 A1 | 4/2014 | Jang et al. |
| 2015/0051738 A1 | 2/2015 | Lee et al. |

FOREIGN PATENT DOCUMENTS

| | | |
|---|---|---|
| EP | 2 354 296 | 8/2011 |
| EP | 02719813 | 4/2014 |
| EP | 2 837 732 | 2/2015 |
| KR | 10-2011-0048352 | 5/2011 |
| KR | 10-2012-0004272 | 1/2012 |
| KR | 10-1156710 | 6/2012 |
| KR | 10-2014-0045714 | 4/2014 |
| KR | 10-2015-0019649 | 2/2015 |
| WO | WO 2005/085511 | 9/2005 |
| WO | WO 2011/078611 | 6/2011 |

OTHER PUBLICATIONS

European Search Report dated Feb. 26, 2018 issued in European Application No. 17193132.2.
European Search Report dated Feb. 26, 2018 issued in European Application No. 17193773.3.
European Search Report dated Jan. 30, 2018 issued in Application No. 17193776.6.
United States Office Action dated Oct. 18, 2019 issued in U.S. Appl. No. 15/715,517.
United States Office Action dated Mar. 24, 2020 issued in U.S. Appl. No. 15/715,517.
U.S. Appl. No. 15/715,517, filed Sep. 26, 2017.
U.S. Appl. No. 15/718,315, filed Sep. 28, 2017.

(a)

(b)

(c)

(d)

WASHING MACHINE AND METHOD OF CONTROLLING THE SAME

CROSS-REFERENCE TO RELATED APPLICATION

This application claims priority under 35 U.S.C. § 119 to Korean Application No. 10-2016-0125759, filed on Sep. 29, 2016, whose entire disclosure is hereby incorporated by reference.

BACKGROUND

1. Field

The present disclosure relates to a washing machine and a method of controlling the same, and more particularly to a washing machine capable of sensing the amount of laundry that is introduced thereinto and a method of controlling the same.

2. Background

In general, a washing machine is an apparatus that treats laundry through various processes, such as washing, spin drying, and/or drying. A predetermined amount of wash water is supplied into a drum containing laundry therein. An appropriate amount of detergent is dissolved in the wash water to remove contaminants from the laundry through the chemical action of the detergent. In addition, the drum, in which the laundry is contained, is rotated to easily remove contaminants from the laundry through the mechanical friction between the wash water and the laundry and vibration of the laundry.

In order to remove contaminants from the laundry, a washing cycle, a rinsing cycle, and a spin-drying cycle are performed. During washing of the laundry, a spin-drying operation is performed in the washing cycle and the rinsing cycle as well as in the spin-drying cycle in order to remove water from the laundry. In the spin-drying operation, a motor is rotated at a high speed. As a result, centrifugal force is applied to the laundry in the drum, whereby water is removed from the laundry.

The spin-drying operation is affected by the amount of laundry and the tangling of laundry, since the motor is rotated at a high speed. As the amount of laundry increases, it is difficult to rotate the motor at a high speed. Furthermore, if the laundry is tangled and is thus collected at one side, the washing machine may be damaged due to unbalance when the motor is rotated at a high speed. Consequently, the washing machine precisely determines the amount of laundry before the execution of spin drying so as to adjust the rotational speed of the motor for spin drying based on the amount of laundry.

In a conventional washing machine, current supplied to the motor at the time of starting the motor, which is in a stationary state, is measured in order to determine the amount of laundry. If the amount of laundry is determined at the time of starting the motor, it is difficult to determine a small amount of laundry. In addition, the amount of laundry that is measured may be changed due to the initial position of laundry in a stationary state and the movement of the laundry caused by driving the motor. Particularly, as the amount of laundry increases, variation in the measured value is increased.

In addition, for a washing machine including a sensorless motor, positional alignment is difficult at the time of starting the motor, whereby variation in the measured amount of laundry is increased. If the variation in the measured amount of laundry is increased, it is not possible to determine the amount of laundry based on calculated data.

If the amount of laundry is not precisely measured, it takes a lot of time to perform the spin-drying operation, in which the motor is rotated at a high speed. As a result, the washing time increases, whereby energy consumption increases.

BRIEF DESCRIPTION OF THE DRAWINGS

The embodiments will be described in detail with reference to the following drawings in which like reference numerals refer to like elements, and wherein.

DETAILED DESCRIPTION

Figure 1:
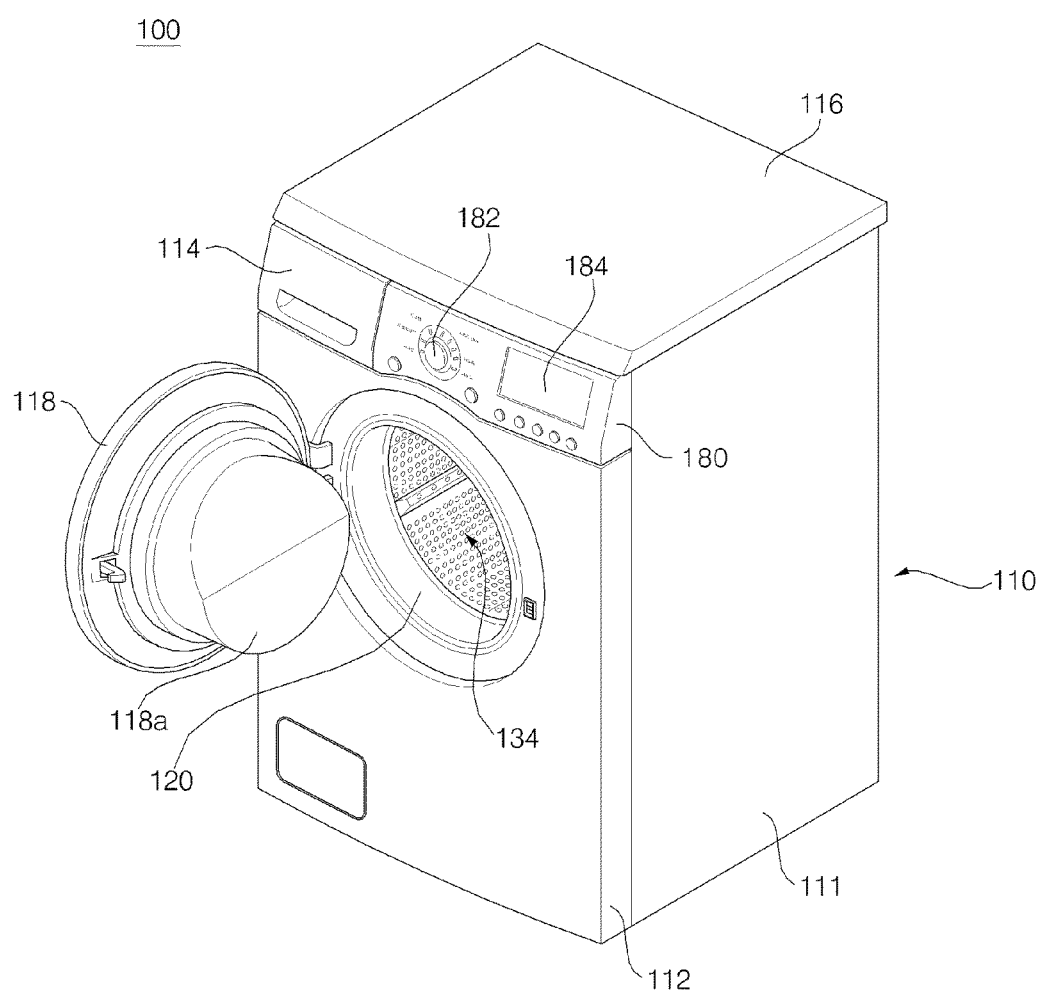
FIG. 1 is a perspective view showing a washing machine according to an embodiment of the present disclosure.
Figure 2:
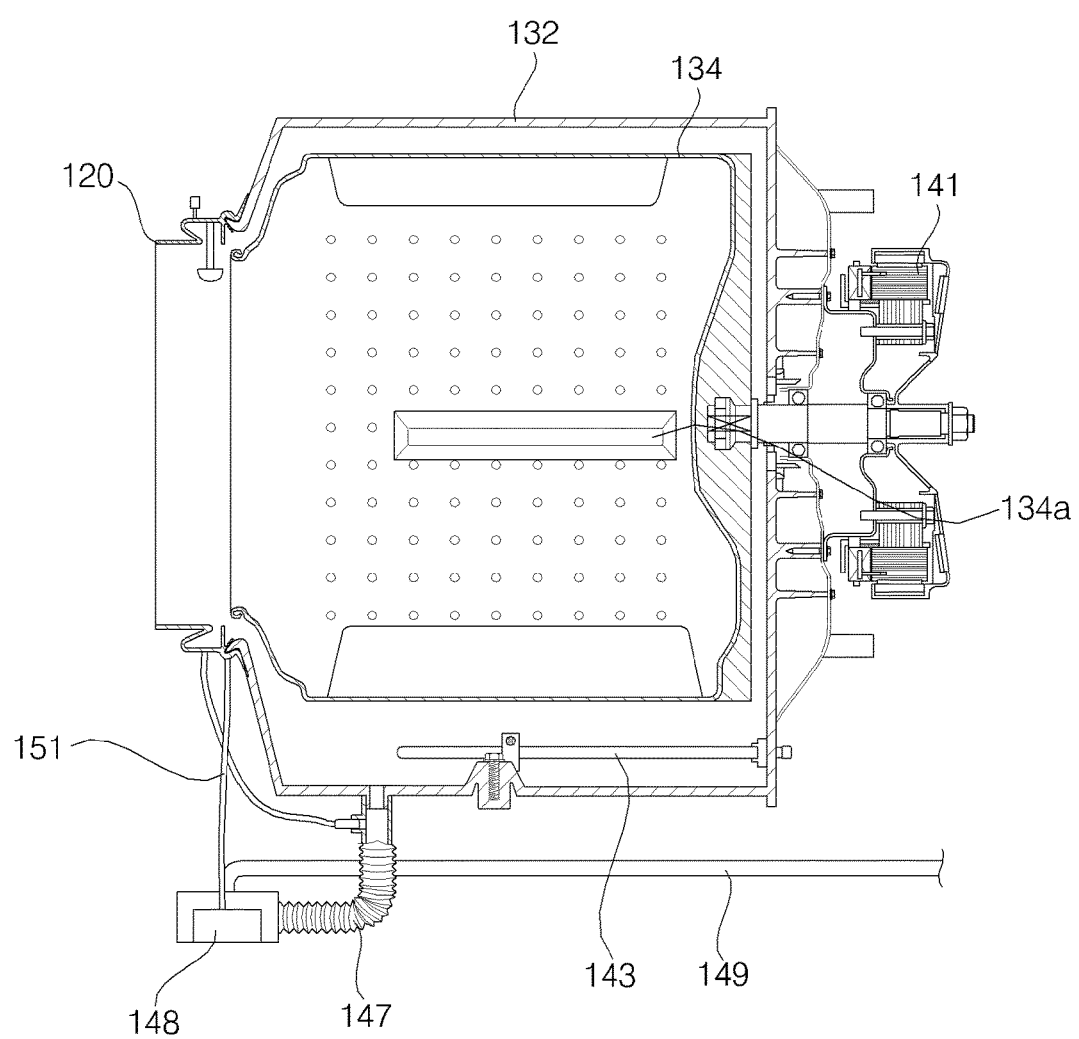
FIG. 2 is a partial sectional view of the washing machine shown in FIG. 1.

FIG. 1 is a perspective view showing a washing machine according to an embodiment of the present disclosure, and FIG. 2 is a partial sectional view of the washing machine shown in FIG. 1. A washing machine 100 according to the present disclosure is configured as shown in FIGS. 1 and 2.

A casing 110 defines the external appearance of the washing machine 100. A tub 132 for containing water is provided in the casing 110 in a suspended state, and a drum 134 for containing laundry is rotatably provided in the tub 132. A heater 143 for heating the water in the tub 132 may be further provided.

The casing 110 may include a cabinet 111 that defines the external appearance of the washing machine 100, the cabinet 111 having an open front and top, a base (not shown) for supporting the cabinet 111, a front cover 112 coupled to the front of the cabinet 111, the front cover 112 being provided with a laundry introduction hole, through which laundry is introduced, and a top cover 116 provided at the top of the cabinet 111. A door 118 for opening and closing the laundry introduction hole may be provided at the front cover 112.

The door 118 may be provided with a glass 118a such that the laundry in the drum 134 is visible from outside the washing machine 100. The glass 118a may be convex. In the state in which the door 118 is closed, the tip end of the glass 118a may protrude to the inside of the drum 134.

A detergent box 114 contains additives, such as preliminary or main washing detergent, fabric softener, and bleach. The detergent box 114 is provided in the casing 110 so as to be capable of being withdrawn therefrom. The detergent box 114 may be partitioned into a plurality of containing spaces, in which the additives are individually contained without being mixed.

In order to absorb vibration generated during the rotation of the drum 134, the tub 132 may be suspended from the top cover 116 via a spring. In addition, a damper may be further provided to support the tub 132 at the lower side thereof.

The drum 134 may be provided with a plurality of holes therein such that water flows between the tub 132 and the drum 134. One or more lifters 134a may be provided on the inner circumferential surface of the drum 134 such that laundry is lifted up and dropped during the rotation of the drum 134. The drum 134 may not be provided completely horizontally, but may be provided at a predetermined inclination such that the rear part of the drum 134 is lower than the horizontal line.

A motor for generating driving force necessary to rotate the drum 134 may be provided. The washing machine may be classified as a direct-driving-type washing machine or an indirect-driving-type washing machine depending on how the driving force generated by the motor is transmitted to the drum 134. In the direct-driving-type washing machine, a rotary shaft of the motor is directly fastened to the drum 134. The rotary shaft of the motor and the center of the drum 134 are aligned with each other on the same line. In the direct-driving-type washing machine, the drum 134 is rotated by a motor 141 provided in a space between the rear of the tub 132 and the cabinet 111.

In the indirect-driving-type washing machine, the drum 134 is rotated using a power transmission means, such as a belt or a pulley, for transmitting the driving force generated by the motor. The rotary shaft of the motor and the center of the drum 134 are not necessarily aligned with each other on the same line. The washing machine according to the present disclosure may be either a direct-driving-type washing machine or an indirect-driving-type washing machine.

A gasket 120 is provided between the casing 110 and the tub 132. The gasket 120 prevents the water contained in the tub 132 from leaking to a space between the tub 132 and the casing 110. One side of the gasket 120 is coupled to the casing 110, and the other side of the gasket 120 is coupled to the circumference of the open front of the tub 132. In addition, the gasket 120 is compressed according to the vibration of the tub 132 to absorb the vibration. The gasket 120 may be made of a deformable or flexible material that is somewhat elastic. For example, the gasket 120 may be made of natural rubber or synthetic resin.

The washing machine is connected to a hot water source H.W. for supplying hot water and a cold water source C.W. for supplying cold water via a hot water hose and a cold water hose, respectively. Water introduced via the hot water hose and the cold water hose is supplied to the detergent box 114, a steam generator, and/or a swirl nozzle under the control of a water supply unit.

A pump 148 drains water discharged from the tub 132 through a drain bellows 147 to the outside via a drain hose 149 or sends the water to a circulation hose 151. In this embodiment, the pump 148 performs both the function of a drain pump and the function of a circulation pump. Depending on the circumstances, a drain pump and a circulation pump may be provided separately.

During the rotation of the drum 134, laundry is repeatedly lifted up by the lifters 134a and dropped. When the drum is rotated at a high speed, the laundry clings to the wall of the drum. At this time, wash water is separated from the laundry by centrifugal force, and is discharged to the tub through the holes formed in the drum. In this way, spin drying is performed.

A control panel 180 may include a course selection unit 182 for allowing a user to select a course and a display unit 184 for allowing the user to input various control commands and displaying the operating state of the washing machine 100.

Figure 3:
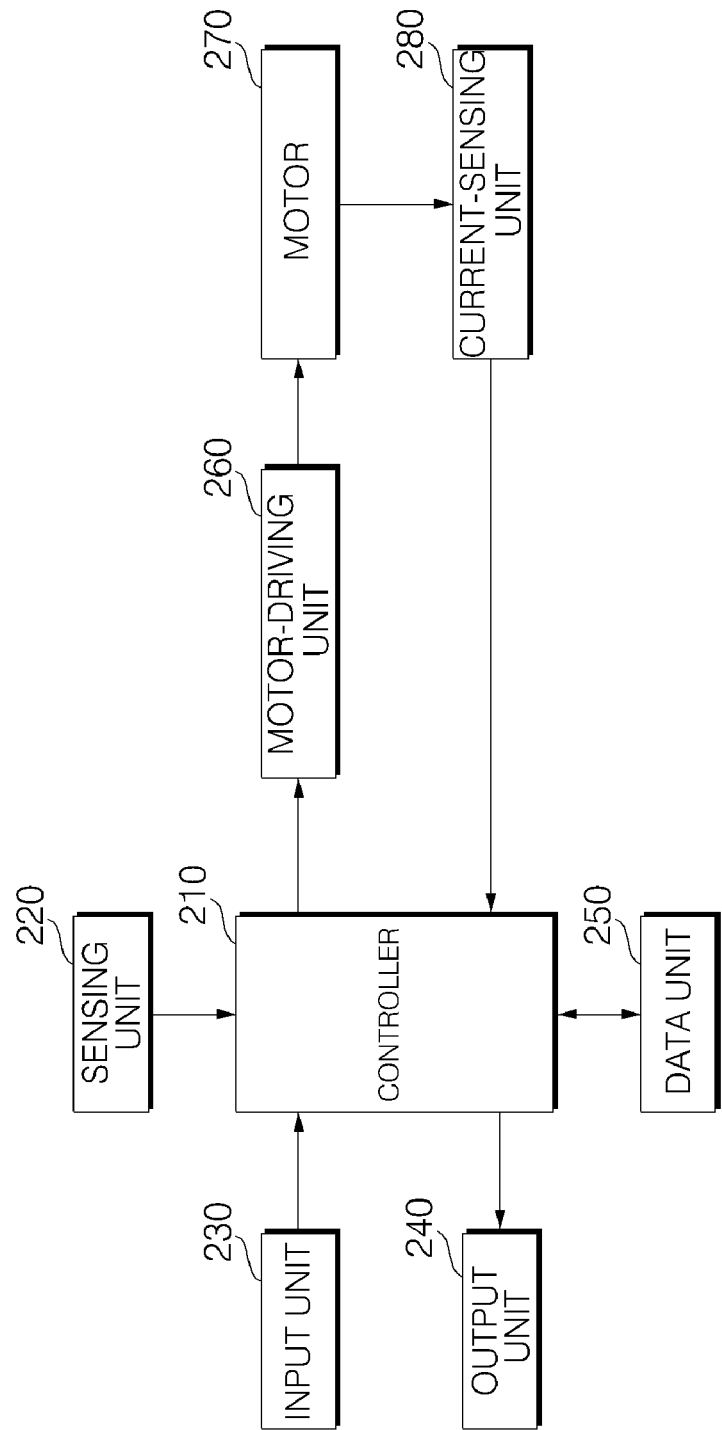
FIG. 3 is a block diagram showing a control construction of the washing machine according to an embodiment of the present disclosure.

FIG. 3 is a block diagram showing a control construction of the washing machine according to an embodiment of the present disclosure. As shown in FIG. 3, the washing machine 100 includes an input unit 230, an output unit 240, a sensing unit 220, a motor-driving unit 260, a motor 270, a current-sensing unit 280, a data unit 250, and a controller 210 for controlling the overall operation of the washing machine, in addition to the structural elements described above.

In addition, the controller 210 controls a water supply valve and a drain valve. The washing machine may further include a control construction for heating wash water. Depending on the circumstances, a communication unit for transmitting and receiving data to and from the outside may be further provided. However, a description thereof will be omitted. The controller 210 may be realized by one or more processors or a hardware device.

The input unit 230, including an input means, such as at least one button, a switch, and a touchpad, allows the user to input operation settings, such as a power on/off input, a washing course, a water level, and a temperature. When a washing course is selected through the course selection unit 182, the input unit 230 transmits data on the selected washing course to the controller.

The output unit 240 includes a display unit 184 for displaying information about the operation setting input through the input unit 230 and outputting the operating state of the washing machine. In addition, the output unit 240 further includes a speaker or a buzzer for outputting a predetermined sound effect or alarm.

The data unit 250 stores control data for controlling the operation of the washing machine, data on the input operation setting, data on the washing course, and reference data for determining whether error has occurred in the washing machine. In addition, the data unit 250 stores data that is sensed or measured by the sensing unit during the operation of the washing machine.

The data unit 250 stores various kinds of information necessary to control the washing machine. The data unit 250 may include a volatile or nonvolatile recording medium. The recording medium stores data that can be read by the microprocessor. The recording medium may include a hard disk drive (HDD), a solid-state disk (SSD), a silicon disk drive (SDD), a ROM, a RAM, a CD-ROM, a magnetic tape, a floppy disk, and an optical data storage device.

The sensing unit 220, including a plurality of sensors, measures the voltage or current of the washing machine, and senses data, such as the rotational speed of the motor, the temperature of wash water, the level of the wash water, and the pressure of the wash water that is supplied or drained, which are transmitted to the controller 210. The sensing unit 220 includes a plurality of sensors, each of which may be selected from among a current sensor (or current sensing device) 280, a voltage sensor, a water level sensor, a temperature sensor, a pressure sensor, and a speed sensor.

The water level sensor is mounted in the drum or the tub to sense the level of wash water and transmit water level data to the controller 210. The temperature sensor measures the temperature of wash water. In addition, a plurality of temperature sensors may be provided at different positions to sense the temperature in a control circuit and the temperature of a heater for heating or drying wash water, if the heater is provided, as well as to sense the temperature of wash water. The current-sensing unit 280 measures the current that is supplied to the motor, and transmits the measured current to the controller 210. The speed sensor senses the rotational speed of the motor and transmits the sensed rotational speed of the motor to the controller. The speed sensor may be connected to the rotary shaft of the motor to sense the rotational speed of the motor based on the voltage output therefrom. Alternatively, a photoelectric sensor may be mounted to the rotary shaft of the motor to sense the rotational speed of the motor. However, the present disclosure is not limited thereto. Various other sensing means may be used.

The motor 270 is connected to the drum to generate power necessary to rotate the drum. A sensorless motor may be used as the motor 270. The motor-driving unit 260 supplies operating power to the motor 270. The motor-driving unit 260 controls the motor to operate or stop in response to a control command from the controller 210. In addition, the motor-driving unit 260 controls the rotational speed of the motor.

The motor-driving unit 260 controls the rotational direction, rotational angle, and rotational speed of the motor 270 in response to a control command from the controller 210. In addition, the motor-driving unit 260 controls the motor 270 to operate differently based on a predetermined washing course and on each of the washing, rinsing, and spin-drying cycles that are performed. At this time, the motor-driving unit 260 controls the rotational direction, rotational angle, and rotational speed of the motor 270 variably such that the wash water in the drum forms a specific form of water current.

The controller 210 controls water supply and drainage depending on the operation setting input through the input unit 230. In addition, the controller 210 generates a control command such that the drum is rotated to perform washing according to the operation of the motor 270, and transmits the control command to the motor-driving unit 260. The controller 210 may control a series of washing processes, such as washing, rinsing, and spin drying.

The controller 210 stores the received operation setting to the data unit 250, and outputs the operation setting or the operating state of the washing machine through the output unit 240. Depending on the circumstances, in the case in which there is a terminal that has a washing machine control application installed therein and is wirelessly connected to the washing machine, the controller may transmit data on the operation setting to the terminal.

While washing is being performed, the controller 210 determines whether the washing is being performed normally based on data received from the sensors of the sensing unit 220 and data received from the current-sensing unit 280. Upon determining that the washing is being abnormally performed, the controller 210 outputs error through the output unit 240.

For example, when the level of wash water does not reach a predetermined water level within a water supply time during the supply of water, when the level of wash water does not reach an empty water level within a predetermined drainage time while the water is being drained, when the empty water level is sensed during the execution of washing, when the temperature of wash water does not reach a predetermined temperature, or when spin drying is not performed a predetermined number of times or within a predetermined amount of time, the controller 210 determines that error has occurred.

The controller 210 transmits a control command to the motor-driving unit 260 such that a washing, rinsing, or spin-drying process is performed according to the operation setting. When the motor is operated, the controller 210 stores and analyzes a current value received from the current-sensing unit 280 to determine the state of the motor and, in addition, to determine the amount of laundry contained in the drum. In addition, the controller 210 determines deviation of laundry, i.e. the unbalance of laundry, based on the measured current.

Particularly, when washing is commenced and the drum is rotated at a high speed, the controller 210 determines the amount of laundry in the drum. Even after the controller 210 has determined the amount of laundry, the controller 210 determines the amount of laundry again before high-speed rotation of the drum when the high-speed rotation of the drum is needed such that the drum is rotated at a high speed in response to the determined amount of laundry. At this time, the controller 210 may change and set the maximum rotational speed in response to the determined amount of laundry.

When the motor is rotated by the motor-driving unit 260, the controller 210 transmits a control command to the motor-driving unit 260 such that the rotational speed of the motor increases or decreases stepwise. During the rotation of the motor, the controller 210 analyzes the current value received from the current-sensing unit 280 in an acceleration period, a maintenance period, and a deceleration period in order to determine the amount of laundry.

The controller 210 calculates gravity and inertial force applied to the drum during the rotation of the motor and counter-electromotive force generated when the motor is braked to determine the amount of laundry.

Figure 4:
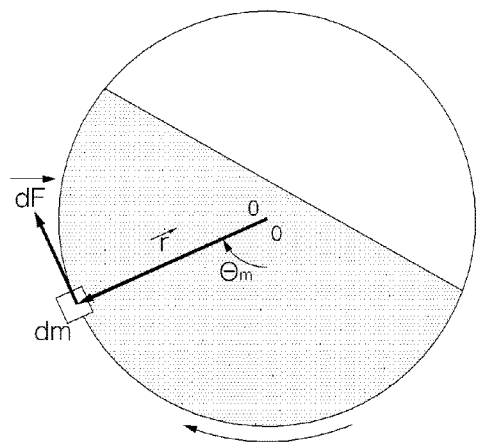
FIG. 4 is a reference view illustrating the application of force to laundry in the washing machine according to the embodiment of the present disclosure.
Figure 4:
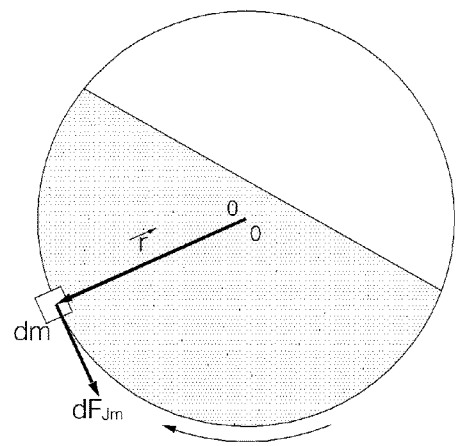
Figure 4:
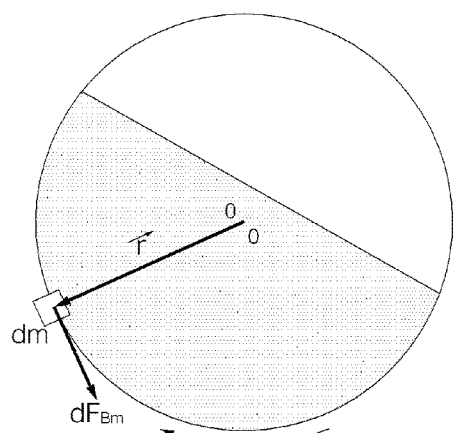
Figure 4:
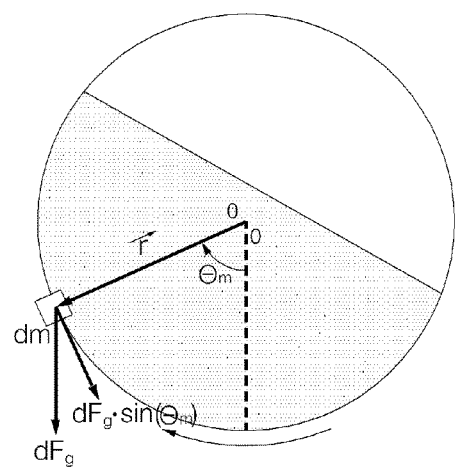

FIG. 4 is a reference view illustrating the application of force to laundry in the washing machine according to the embodiment of the present disclosure. As previously described, the controller 210 determines the amount of laundry using the force applied to the drum. As shown in FIG. 4, various forces are applied to the drum, in which laundry is placed.

The washing machine separates foreign matter from the laundry and removes wash water from the laundry using the rotation of the drum. Consequently, motor torque, inertial torque, frictional torque, and load torque are applied to rotate the drum.

The motor torque is force that is applied to rotate the motor, which is connected to the drum. The inertial torque is force that impedes the rotation of the drum due to inertia, by which the existing operating state (rotation) is maintained, when the drum is accelerated or decelerated during the rotation of the drum. The frictional torque is force that impedes the rotation of the drum due to the friction between the drum and the laundry, between the door and the laundry, or between individual laundry items. The load torque is force that impedes the rotation of the drum due to the weight of laundry.

The washing machine does not determine the amount of laundry at the time of starting the motor but determines the amount of laundry during the rotation of the drum. Hereinafter, therefore, the application of force to laundry at an angle θm will be described by way of example.

As shown in FIG. 4(a), motor torque Te is force necessary at the time of operating the motor. Consequently, the motor torque Te is expressed as the sum of inertial torque, frictional torque, and load torque. The motor torque Te is the product of force necessary to lift up the laundry and the radius r of the drum.

As shown in FIG. 4(b), inertial torque Jm is applied as force that impedes the rotation of the drum due to inertia based on the distribution of the laundry in the drum when the drum is accelerated or decelerated during the rotation of the drum. At this time, the inertial torque is proportional to mass m and the square of the radius of the drum.

As shown in FIG. 4(c), frictional torque Bm is frictional force that is applied between the laundry and the tub and between the laundry and the door. Consequently, the frictional torque is proportional to rotational speed Wm. The frictional torque may be the product of the coefficient of friction and the rotational speed.

As shown in FIG. 4(d), load torque TL is gravity that is applied depending on the distribution of the laundry at the time of starting the motor. The load torque may be calculated from the weight (mass m) of the laundry, acceleration due to gravity g, the radius r of the drum, and the angle θm. Force applied to the laundry at the angle θm is force Fg due to gravity g. Since the drum is rotated, however, the force may be calculated as the product of the gravity and sin(θm). The force Fg due to gravity is decided by acceleration due to gravity, the radius of the drum, and the mass of the laundry.

During the rotation of the drum, the motor torque, the inertial torque, the frictional torque, and the load torque are applied simultaneously. These force components are reflected in the current value of the motor. Consequently, the controller 210 calculates the amount of laundry using the current value measured by the current-sensing unit during the operation of the motor.

The motor torque is greatly affected by gravity due to the weight of the laundry. When the weight of the laundry exceeds a predetermined weight, resolution is lowered. That is, if the amount of laundry exceeds a predetermined level, discrimination due to the weight of the laundry is reduced as the amount of laundry increases.

When there is friction between the laundry and the door and when the laundry is caught in the door, a change in the value of the frictional torque increases, with the result that the frictional torque is distributed. Particularly, when the amount of laundry increases, the distribution of the frictional torque greatly increases.

The value of the load torque is deviated due to the movement of the laundry. In addition, when the weight of the laundry exceeds a predetermined level, the movement of the laundry is reduced. As a result, the load torque is reduced. In contrast, the inertial torque exhibits linearity with respect to the amount (weight) of laundry, although the inertial torque is affected by the movement of the laundry. Consequently, it is possible to more precisely measure the amount of laundry.

Since the inertial torque is resting force, the inertial torque is applied at the time of acceleration or deceleration. That is, the inertial torque is applied in the acceleration period and the deceleration period. In the case in which the rotational speed is uniform, however, no inertial torque is applied, and the motor torque, the frictional torque, and the load torque are applied.

The characteristics of the inertial torque may be calculated by excluding data in the maintenance period from data in the acceleration period and the deceleration period. Inertia may be calculated by subtracting the current value in the maintenance period from the current value in the acceleration period and the current value the deceleration period, dividing the resultant value by the variation of speed per unit time, i.e. acceleration, and multiplying the resultant value by counter-electromotive force.

Consequently, the washing machine may analyze the force applied in the acceleration period, the deceleration period, and the maintenance period to determine the amount of laundry based on the inertial torque. In addition, the washing machine may calculate gravity depending on the amount of laundry in the maintenance period. In addition, the washing machine may calculate counter-electromotive force generated by braking in the deceleration period in order to calculate the amount of laundry.

In addition, since the washing machine measures the current value during the rotation of the motor in order to calculate a laundry-amount sensing value, error due to the alignment of the motor at the time of starting the motor may be eliminated. In addition, the laundry moves uniformly without the change of a load, i.e. without irregular movement of the laundry, in the maintenance period, whereby it is possible to minimize error due to the change of the load.

At this time, the washing machine differently applies laundry amount data for calculating the laundry-amount sensing value in the maintenance period and laundry amount data for calculating the laundry-amount sensing value in the acceleration and deceleration periods. In the maintenance period, the characteristics of inertia are minimized. In the acceleration period and the deceleration period, inertia is strongly applied. Consequently, the laundry-amount sensing values are calculated based on different data and compared with each other to determine the final amount of laundry.

As previously described, the controller 210 calculates the inertial torque applied during the operation of the motor to determine the amount of laundry. Consequently, the controller 210 performs control to accelerate or decelerate the motor after the rotational speed of the motor is increased to a predetermined rotational speed. The controller 210 divides the maintenance period, the acceleration period, and the deceleration period from each other based on the rotational speed of the motor, and determines the amount of laundry using current values measured in the respective periods during the operation of the motor.

The controller 210 calculates the amount of laundry using the frictional torque and the load torque, which are affected by gravity in the maintenance period, in which the motor is rotated at a low speed, accelerates the motor starting in the maintenance period such that the characteristics of the inertial torque are emphasized at a rotational speed of the motor that is higher than that in the maintenance period in order to determine the amount of laundry using inertia in the acceleration period. In addition, the controller calculates counter-electromotive force in the deceleration period in order to determine the amount of laundry. The counter-electromotive force is electromotive force that is generated by current formed from the motor in the opposite direction when the motor is braked.

The controller 210 multiplies the averages of the current values for the respective periods by counter-electromotive force to calculate the amount of laundry. The amount of laundry in the acceleration period is determined based on the laundry amount data for the inertial torque, and the amount of laundry in the maintenance period is determined based on the laundry amount data for on the gravitational torque. In addition, since the characteristics of the motor based on the kind or performance of the motor are reflected in the counter-electromotive force, the counter-electromotive force is used in calculating the amount of laundry in order to compensate therefor.

Consequently, the controller 210 may subtract the current value in the maintenance period from the current value in the acceleration period and multiply the resultant value by the counter-electromotive force to calculate the amount of laundry. Both a primary maintenance period and a secondary maintenance period are taken into consideration, and the average of the current values in the primary maintenance period and the secondary maintenance period may be subtracted from the current value in the acceleration period in order to determine the amount of laundry.

While the rotational speed of the motor is repeatedly maintained, accelerated, and decelerated, the controller 210 stores the measured current value on a per-period basis and calculates the average thereof to determine the amount of laundry.

Figure 5:
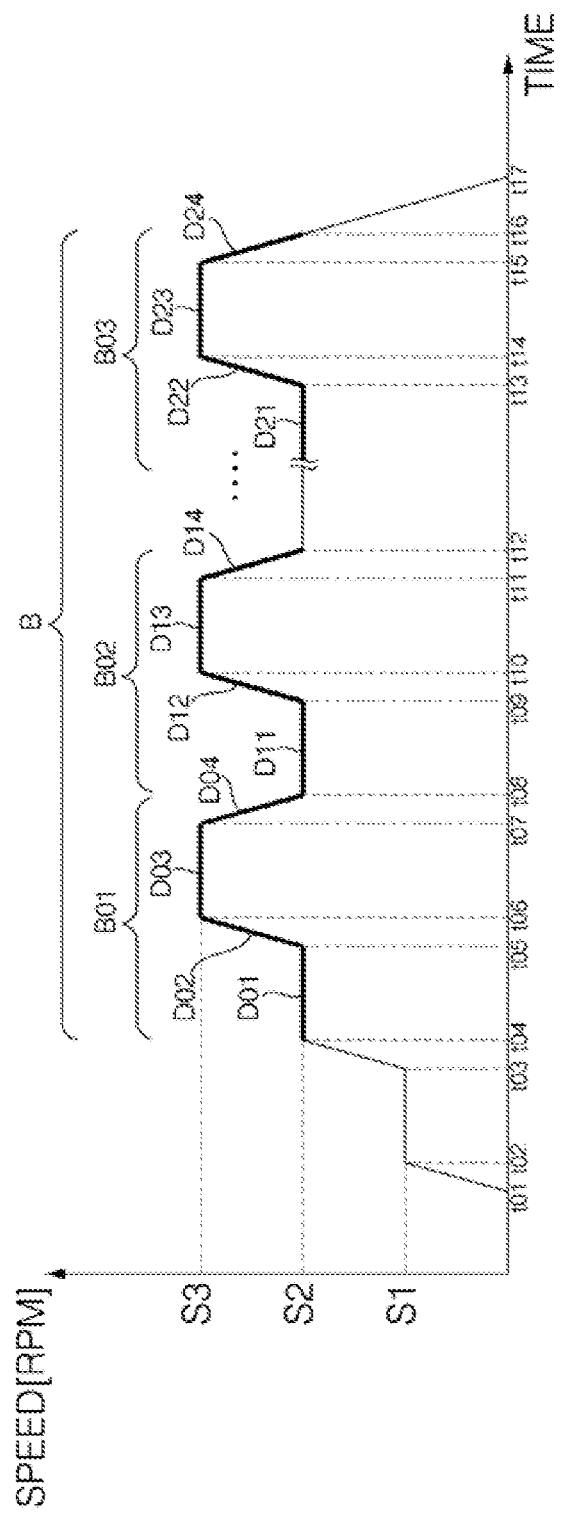
FIG. 5 is a reference view illustrating a method of measuring the amount of laundry in the washing machine according to the embodiment of the present disclosure.

FIG. 5 is a reference view illustrating a method of measuring the amount of laundry in the washing machine according to the embodiment of the present disclosure. As shown in FIG. 5, the controller 210 controls the rotational speed of the motor in order to determine the amount of laundry.

The controller 210 compares the current values in the acceleration period and the maintenance period with each other and calculates the counter-electromotive force in the deceleration period to determine the amount of laundry. In order to determine the amount of laundry, the controller 210 transmits a control command to the motor-driving unit 260 to control the rotational speed of the motor.

The controller 210 sets the rotational speed of the motor at which the laundry tumbles in the rotating drum as a first speed S1. The controller 210 sets the rotational speed of the motor at which the laundry starts to cling to the wall of the drum by centrifugal force generated in the drum as the rotational speed of the motor increases, at which some of the laundry rotates along with the drum in the state of clinging to the wall of the drum, and at which some of the laundry is lifted up and dropped by the rotation of the drum as a second speed S2. The controller 210 sets the rotational speed of the motor which is higher than the second speed and at which the laundry clings to the wall of the drum as the centrifugal force increases in the drum as a third speed S3.

For example, the first speed may be set in the range from 30 rpm to 40 rpm, the second speed may be set in the range from 60 rpm to 70 rpm, and the third speed may be set in the range from 75 rpm to 85 rpm. The first speed to the third speed may be changed depending on the size of the drum and the kind and performance of the motor.

The controller 210 controls the rotational speed of the motor within a range from the first speed to the third speed. At the second speed and the third speed, the controller 210 performs control such that the rotational speed of the motor is accelerated, maintained, and decelerated, which is repeated a predetermined number of times.

Since the laundry starts to cling to the wall of the drum starting at the second speed and most of the laundry clings to the wall of the drum at the third speed, the controller 210 determines the amount of laundry using current values at the second speed and the third speed, thereby reducing error in current values due to the movement of the laundry.

In addition, if the laundry is collected at one side while the motor is rotated at the third speed, vibration occurs due to high-speed rotation, with the result that the washing machine may be damaged. When the rotational speed of the motor reaches the third speed, therefore, the controller 210 senses the unbalance of the drum to perform control such that the rotational speed of the motor is maintained at the third speed or is decelerated. In addition, if the unbalance is equal to or higher than a predetermined level, the controller 210 decelerates the rotational speed of the motor to the first speed in order to disperse the laundry.

In response to the control command from the controller, the motor-driving unit 260 starts the motor at a first time t01, and accelerates the motor until the rotational speed of the motor reaches the first speed S1. When the rotational speed of the motor reaches the first speed S1, the motor-driving unit 260 maintains the rotational speed of the motor at the first speed for a predetermined amount of time t02 to t03 in response to the control command. Since the laundry tumbles in the drum at the first speed, the laundry is dispersed without being tangled for the amount of time ranging from the second to third times t02 to t03.

In addition, the motor-driving unit 260 accelerates the rotational speed of the motor from the first speed to the second speed S2 at the third time t03. When the rotational speed of the motor reaches the second speed S2 at a fourth time t04, the motor-driving unit 260 maintains the rotational speed of the motor at the second speed S2 in a first maintenance period D01 (also referred to as a first period of time) from the fourth time t04 to a fifth time t05.

At this time, the current-sensing unit 280 measures the current of the motor in the first maintenance period, in which the rotational speed of the motor is maintained at the second speed S2, and transmits the sensed current of the motor to the controller.

After the lapse of a predetermined amount of time, the motor-driving unit 260 accelerates the rotational speed of the motor from the second speed to the third speed S3 at the fifth time t05. An amount of time ranging from the fifth time to a sixth time constitutes a first acceleration period D02. The current-sensing unit 280 measures the current of the motor during the first acceleration period, and transmits the sensed current of the motor to the controller.

When the rotational speed of the motor reaches the third speed at a sixth time t06, the motor-driving unit 260 maintains the rotational speed of the motor at the third speed. An amount of time ranging from the sixth time t06 to a seventh time t07 constitutes a second maintenance period D03 (also referred to as a second period of time). The current-sensing unit 280 measures the current of the motor during the second maintenance period, and transmits the sensed current of the motor to the controller. At this time, each maintenance period may be set in the range from 1.5 to 2.5 seconds.

The motor-driving unit 260 brakes the motor at the seventh time t07 to decelerate the rotational speed of the motor. When the rotational speed of the motor reaches the second speed S2 at an eighth time t08, the motor-driving unit 260 stops deceleration and maintains the rotational speed of the motor at the second speed. An amount of time ranging from the seventh time t07 to the eighth time constitutes a first deceleration period. The current-sensing unit 280 measures the current of the motor during the first deceleration period, and transmits the sensed current of the motor to the controller.

In this way, the controller 210 controls the motor-driving unit such that the rotational speed of the motor is accelerated from the first speed to the second speed, is accelerated from the second speed to the third speed, and is decelerated to the second speed again, which is repeated.

The controller 210 sets the first maintenance period, in which the rotational speed of the motor is maintained at the second speed, the first acceleration period, the second maintenance period, in which the rotational speed of the motor is maintained at the third speed, and the first deceleration period as a first period B01, stores current data on a per-period basis, and maintains, accelerates, maintains, and decelerates the rotational speed of the motor within the range from the second speed to the third speed, which is repeated a predetermined number of times. In addition, the controller 210 repeats the above operation, for example, 4 to 6 times, and calculates average values in the maintenance, acceleration, and deceleration periods in order to determine the amount of laundry.

The motor-driving unit 260 controls the rotational speed of the motor in a second period B02 from the eighth time t08 to a twelfth time t12. The current-sensing unit 280 measures the current of the motor in third and fourth maintenance periods D11 and D13, a second acceleration period D13, and a second deceleration period D14 of the second period B02, and transmits the sensed current of the motor to the controller.

In addition, the motor-driving unit 260 repeats the above operation. After a fifth maintenance period D21, in which the rotational speed of the motor is maintained at the second speed, of a third period B03, the motor-driving unit 260 accelerates the rotational speed of the motor to the third speed at a thirteenth time t13 (a third acceleration period D22), maintains the rotational speed of the motor at the third speed S3 for an amount of time ranging from a fourteenth time t14 to a fifteenth time t15 (a sixth maintenance period D23), and decelerates the rotational speed of the motor at the fifteenth time (a third deceleration period D24). Additionally, when the rotational speed of the motor reaches the second speed at a sixteenth time, the motor-driving unit 260 brakes the motor such that the motor is stopped at a seventeenth time t17, since a predetermined number of times has been reached.

In the first to third periods B01 to B03, the controller 210 finally determines the amount of laundry based on current values that are measured while the maintenance period, the acceleration period, the maintenance period, and the deceleration period are repeated. In the first to third periods B01 to B03, the controller 210 sense unbalance of the drum based on current values measured during the maintenance periods in which the rotational speed of the motor is maintained at the third speed in order to control the motor.

Figure 6:
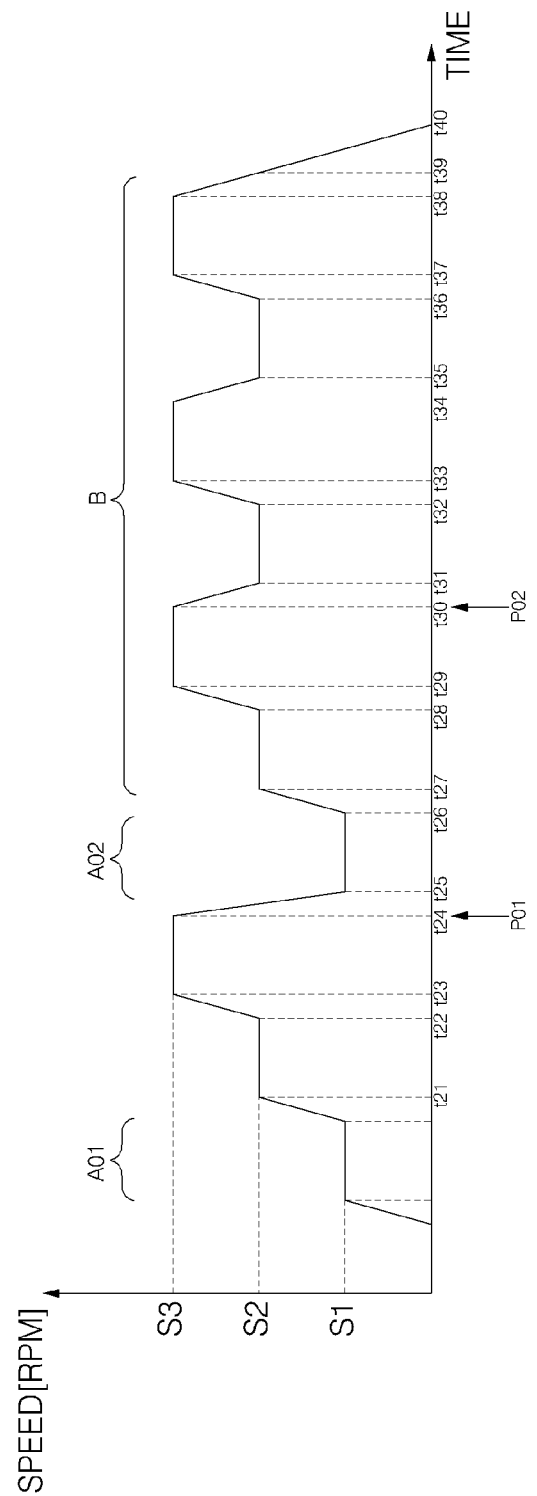
FIG. 6 is a view showing a change in the speed of a motor due to unbalance when the amount of laundry is measured as shown in FIG. 5.

FIG. 6 is a view showing a change in the speed of the motor due to unbalance when the amount of laundry is measured as shown in FIG. 5. When the rotational speed of the motor reaches the third speed in the first to third periods B01 to B03, the controller 210 stores the amount of laundry measured by sensing unbalance, described with reference to FIG. 5, or controls the rotational speed of the motor to disperse the laundry and measure the amount of laundry again.

As shown in FIG. 6, in response to the control command, the motor-driving unit 260 starts the motor, and performs first laundry dispersion A01 while maintaining the rotational speed of the motor at the first speed. In addition, the motor-driving unit 260 accelerates the rotational speed of the motor such that the rotational speed of the motor is increased stepwise from the second speed to the third speed, and the current-sensing unit measures current in each period and transmits the measured current to the controller.

When the rotational speed of the motor reaches the third speed, the controller senses unbalance of the drum due to the laundry in the drum based on the current value received from the current-sensing unit in the period in which the rotational speed of the motor is maintained at the third speed. For example, the controller analyzes the riffles in the current value in the maintenance period, in which the rotational speed of the motor is maintained uniform, to sense unbalance. When shaking of the drum increases due to unbalance, variation in the ripples in the measured current value, based on which unbalance may be sensed. However, this method is merely an example of an unbalance sensing method. Consequently, unbalance may be sensed variously, and other different methods may be used.

When unbalance in the period in which the rotational speed of the motor is maintained at the third speed is equal to or higher than a predetermined level, the controller 210 decelerates the rotational speed of the motor to the first speed S1 in order to untangle the laundry, and then accelerates the rotational speed of the motor. After unbalance is sensed in the period in which the rotational speed of the motor is maintained (P01), therefore, the motor-driving unit 260 brakes the motor at a twenty-fourth time t24 to decelerate the rotational speed of the motor to the first speed S1. The current-sensing unit measures current during deceleration, and transmits the measured current to the controller as data in the deceleration period. When the rotational speed of the motor reaches the first speed, the motor-driving unit 260 maintains the rotational speed of the motor at the first speed for a predetermined amount of time t25 to t26 in order to perform second laundry dispersion S02.

After laundry dispersion, the motor-driving unit 260 accelerates the motor at a twenty-sixth time 26. When the rotational speed of the motor reaches the second speed, the motor-driving unit 260 maintains the rotational speed of the motor at the second speed (t27 to t28), accelerates the rotational speed of the motor to the third speed (t28 to t29), maintains the rotational speed of the motor at the third speed, and decelerates the rotational speed of the motor to the second speed, which is repeated in order to determine the amount of laundry (B).

While the rotational speed of the motor is maintained at the third speed, the controller 210 senses unbalance based on the measured current (P02), and decelerates the rotational speed of the motor to the first speed in order to disperse the laundry, or decelerates the rotational speed of the motor to the second speed and then accelerates the rotational speed of the motor, which is repeated in order to decide whether to determine the amount of laundry, and then controls the motor-driving unit. If unbalance is lower than the predetermined level, the controller 210 repeats the operation for determining the amount of laundry, described with reference to FIG. 5, (t29 to t35). When a predetermined number of times has been reached, the controller 210 finally determines the amount of laundry.

Meanwhile, when unbalance in the period in which the rotational speed of the motor is maintained at the third speed is equal to or higher than the predetermined level, the controller 210 decelerates the rotational speed of the motor to the first speed in order to disperse the laundry. When the laundry dispersion is completed, the controller 210 determines the amount of laundry again. At this time, if the number of times the laundry has been dispersed is equal to or greater than a predetermined number of times, the controller 210 stops the operation for determining the amount of laundry, even though the operation has not been performed the predetermined number of times, and determines the amount of laundry based on the measured current values.

Figure 7:
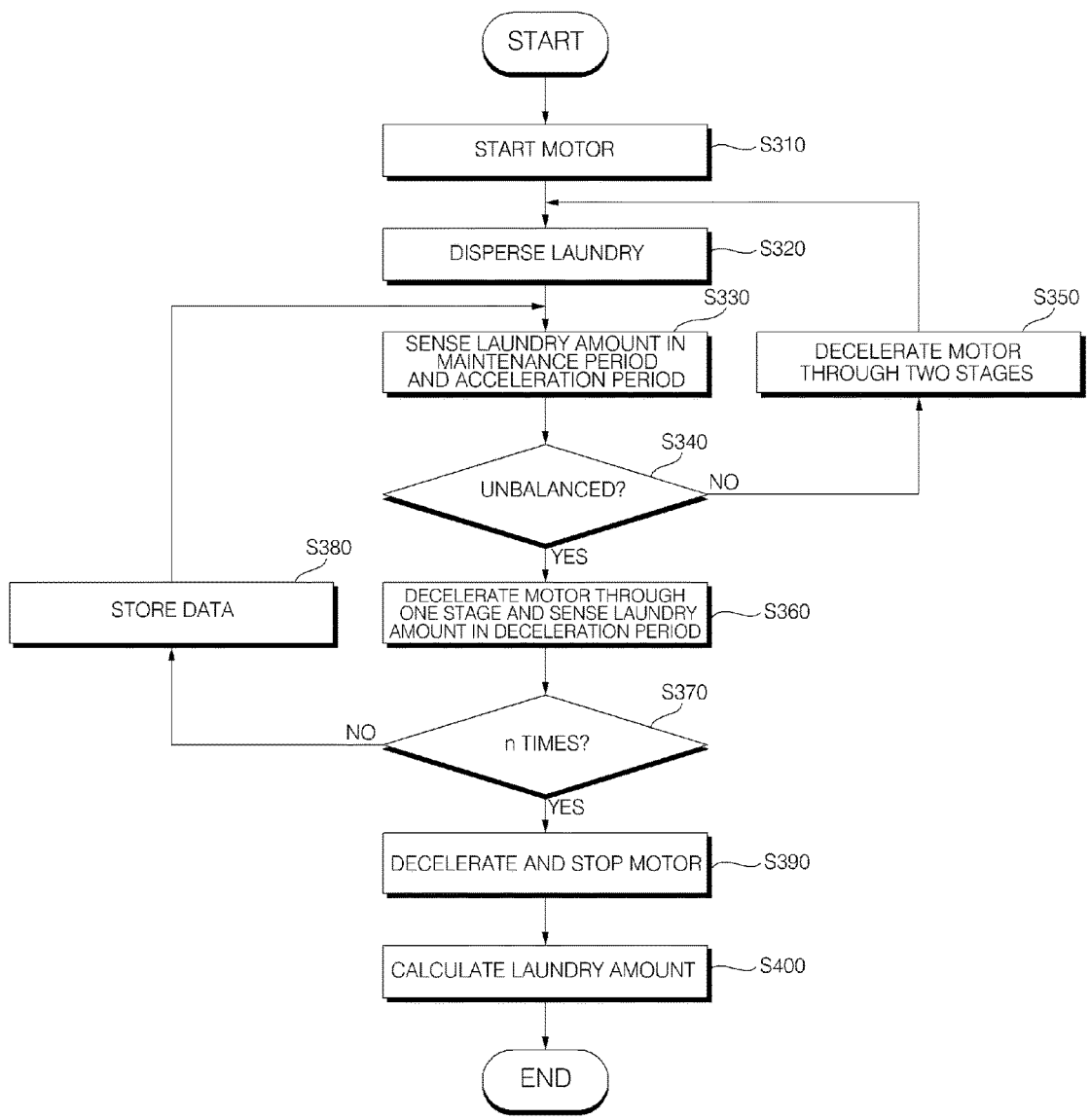
FIG. 7 is a flowchart showing a control method for measuring the amount of laundry in the washing machine according to the present disclosure.

FIG. 7 is a flowchart showing a control method for measuring the amount of laundry in the washing machine according to the present disclosure. As shown in FIG. 7, when washing is commenced, the controller 210 senses the amount of laundry before commencing high-speed spin drying. In order to sense the amount of laundry, the controller 210 transmits a control command for controlling the motor to the motor-driving unit 260.

In order to determine the amount of laundry during the operation of the washing machine, the controller 210 controls the rotational speed of the motor, as described with reference to FIG. 5. In response to the control command from the controller, the motor-driving unit 260 supplies operating power to the motor, and the motor is driven (S310).

The motor-driving unit 260 accelerates the motor such that the motor is rotated at the first speed S1, and maintains the rotational speed of the motor at the first speed. Consequently, the motor is rotated at the first speed for a predetermined amount of time, and the laundry tumbles in the rotating drum, whereby the laundry is dispersed (S320).

After the laundry is dispersed, the controller 210 controls the motor-driving unit such that the rotational speed of the motor is maintained or accelerated, and receives current values in the period in which the rotational speed of the motor is maintained and in the period in which the rotational speed of the motor is accelerated in order to sense the amount of laundry (laundry amount) (S330).

While the motor is rotated at the rotation speed at which the laundry clings to the wall of the drum, the controller 210 determines unbalance of the drum based on the measured current values (S340). At the rotational speed of the motor at which the laundry clings to the wall of the drum, vibration may occur due to tangling of the laundry or collection of the laundry at one side, whereby the washing machine may be damaged. For this reason, unbalance of the drum is determined.

When unbalance is equal to or higher than the predetermined level, the controller 210 decelerates the rotational speed of the motor through two stages (S320). When unbalance is equal to or higher than the predetermined level, the controller 210 decelerates the rotational speed of the motor to a speed lower than the speed in the deceleration period for sensing the amount of laundry. In the case in which deceleration for sensing the amount of laundry is one-stage deceleration, deceleration to the speed for laundry dispersion is two-stage deceleration.

After the laundry is dispersed, the controller 210 senses the amount of laundry again (S330). Meanwhile, when the unbalance is lower than the predetermined level, the controller 210 decelerates the rotational speed of the motor through one stage, accelerates the rotational speed of the motor, and maintains the rotational speed of the motor, which is repeated to sense the amount of laundry again (S360).

If the amount of laundry is sensed through only one measurement, error is introduced due to the speed of the motor and the movement of the laundry. For this reason, repetition is performed a predetermined number of times n (S330 to S370). While the operation for sensing the amount of laundry is repeated, current data in each period is stored in the data unit on a per-period basis (S380).

After the rotational speed of the motor is repeatedly maintained, accelerated, and decelerated for the predetermined number of times, the controller 210 performs controls such that the motor is stopped (S390), calculates the average of the stored current values on a per-period basis, and determines the amount of laundry using the average value. For example, the controller 210 may subtract the average of the current values in the maintenance period from the average of the current values in the acceleration period and multiply the resultant value by counter-electromotive force to calculate a laundry-amount sensing value. The controller 210 compares the calculated laundry-amount sensing value with data on the amount of laundry to finally determine the amount of laundry.

After determining the amount of laundry, the controller 210 controls the motor-driving unit to perform the next operation based on the determined amount of laundry. In addition, the controller 210 may set a limit value for unbalance based on the amount of laundry. For example, the controller 210 sets the maximum spin-drying speed based on the amount of laundry, and transmits a control command to the motor-driving unit 260. As a result, the drum is rotated at the set maximum spin-drying speed to perform spin drying. Here, the spin drying includes spin drying after washing, spin drying after rinsing, and final spin drying.

Figure 8:
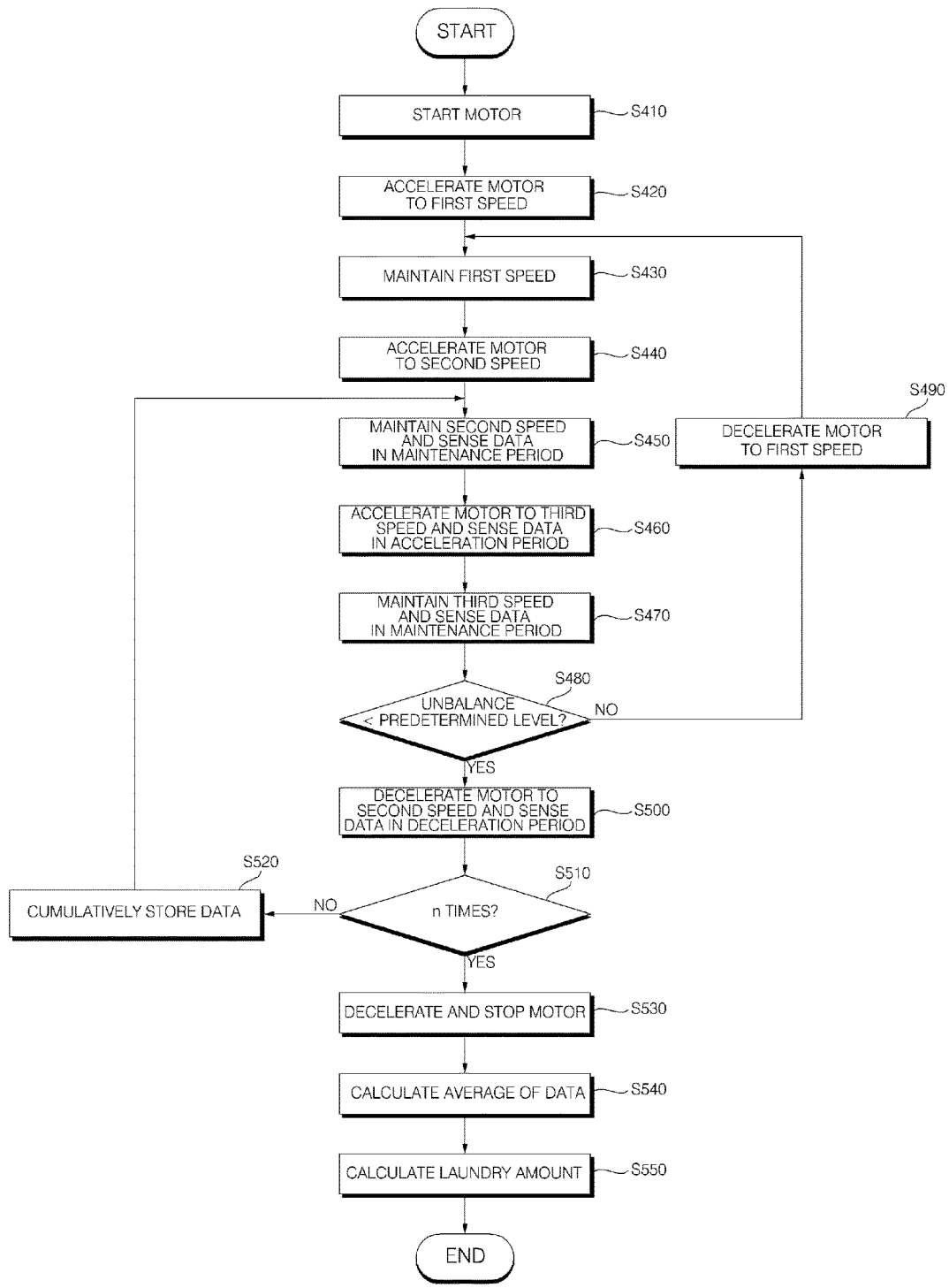
FIG. 8 is a flowchart showing a control method for measuring the amount of laundry based on a change in the speed of the motor as shown in FIG. 7.

FIG. 8 is a flowchart showing a control method for measuring the amount of laundry based on a change in the speed of the motor as shown in FIG. 7. As described above, in order to determine the amount of laundry, the controller controls such that the rotational speed of the motor is repeatedly maintained, accelerated, and decelerated, which is repeated to sense the amount of laundry. When the motor is rotated at a predetermined speed or higher, the controller determines that unbalance has occurred, disperses the laundry, and senses the amount of laundry.

As shown in FIG. 8, in response to the control command from the controller, the motor-driving unit 260 starts the motor 270 (S410). The motor-driving unit 260 accelerates the motor to the first speed S1 (S420). When the rotational speed of the motor reaches the first speed, the motor-driving unit 260 maintains the rotational speed of the motor at the first speed (S430). Since the laundry tumbles in the drum at the first speed, the laundry is dispersed.

After the laundry is dispersed, the motor-driving unit 260 accelerates the motor to the second speed S2 in response to the control command from the controller (S440). When the rotational speed of the motor reaches the second speed, the motor-driving unit 260 maintains the rotational speed of the motor at the second speed for a predetermined amount of time, and the current-sensing unit 280 measures the current of the motor and transmits the measured current of the motor to the controller 210 (S450). The measured current value is stored in the data unit as data in the maintenance period.

The motor-driving unit 260 accelerates the motor to the third speed, and the current-sensing unit 280 measures the current of the motor during the acceleration period and transmits the measured current to the controller 210 (S460). When the rotational speed of the motor reaches the third speed, the motor-driving unit 260 maintains the rotational speed of the motor at the third speed for a predetermined amount of time, and the current-sensing unit 280 measures the current of the motor and transmits the measured current of the motor to the controller 210 (S470). The measured current value is stored in the data unit as data in the maintenance period.

The controller 210 senses unbalance based on the current value in the maintenance period in which the rotational speed of the motor is maintained at the third speed, and compares the sensed unbalance with a predetermined level (S480). When the unbalance is equal to or higher than the predetermined level, the controller 210 transmits a control command to the motor-driving unit to decelerate the rotational speed of the motor through two stages such that laundry dispersion is performed. As a result, the motor-driving unit brakes the motor such that the rotational speed of the motor is decelerated to the first speed (S490). At this time, the current-sensing unit measures data in the deceleration period, and transmits the measured data to the controller.

The motor-driving unit maintains the rotational speed of the motor at the first speed to perform laundry dispersion (S430). After the laundry is dispersed, the motor-driving unit 260 accelerates the rotational speed of the motor to the second speed to determine the amount of laundry again (S440 to S470). Meanwhile, when the unbalance is lower than the predetermined level, the controller 21 performs control such that the operation for sensing the amount of laundry is repeated a predetermined number of times.

The motor-driving unit 260 decelerates the rotational speed of the motor through one stage, i.e. to the second speed, and the current-sensing unit measures data in the deceleration period and transmits the measured data to the controller (S500).

The motor-driving unit 260 maintains the rotational speed of the motor at the second speed, accelerates the rotational speed of the motor to the third speed, maintains the rotational speed of the motor at the third speed, and decelerates the rotational speed of the motor to the second speed, which is repeated a predetermined number of times n (S510 and S450 to S500). At this time, the controller 210 cumulatively stores data in each period in the data unit in order to determine the amount of laundry (S520). After the above operation is repeated the predetermined number of times, the motor-driving unit 260 brakes the motor to stop the motor (S530).

The controller 210 calculates the averages in the acceleration period and the maintenance period based on the stored data in the respective periods, calculates counter-electromotive force from the deceleration period, subtracts the current value in the maintenance period from the current value in the acceleration period, multiplies the resultant value by the counter-electromotive force to calculate a laundry-amount sensing value for determining the amount of laundry, and determines the amount of laundry based thereon (S550).

Figure 9:
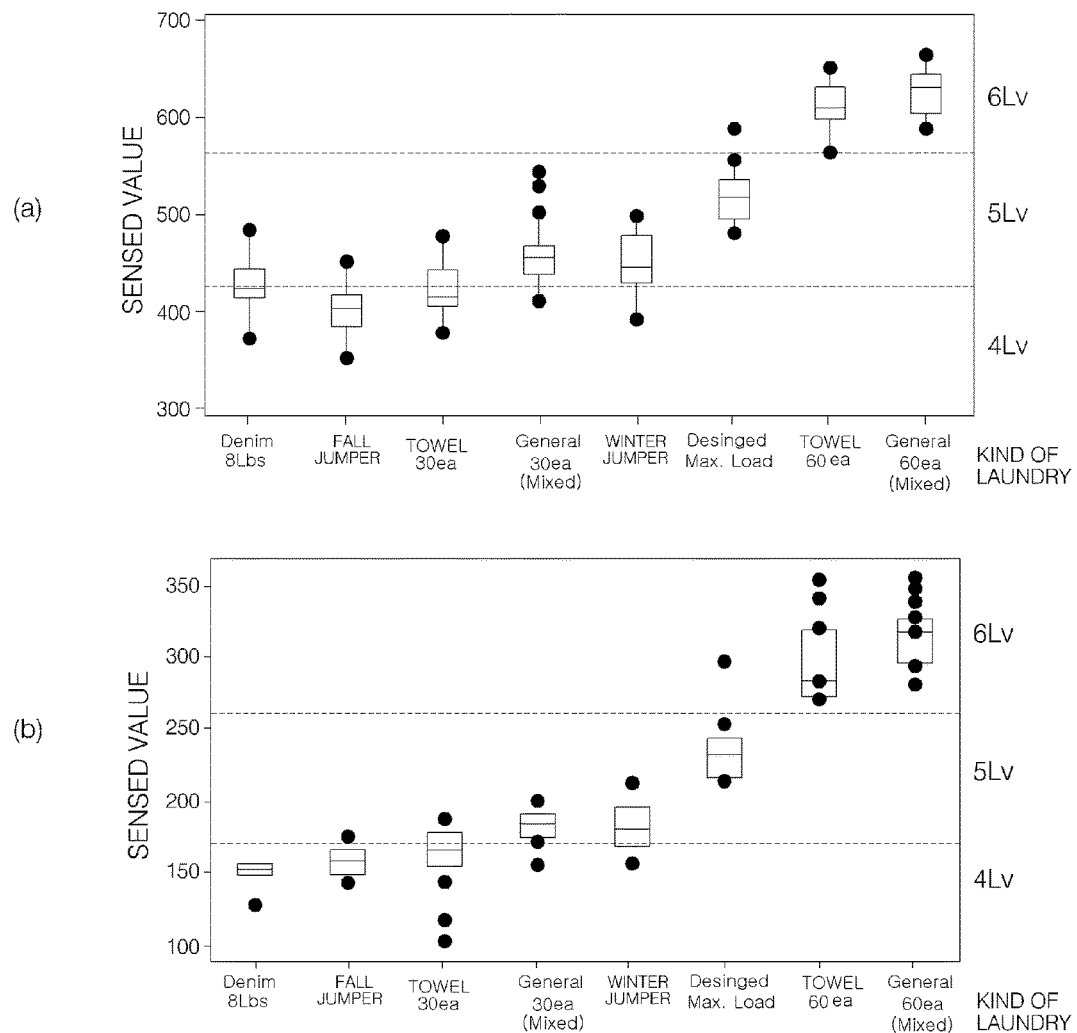
FIGS. 9 and 10 are views showing the results of measurement of the amount of laundry based on the kind of laundry in the washing machine according to the present disclosure.
Figure 10:
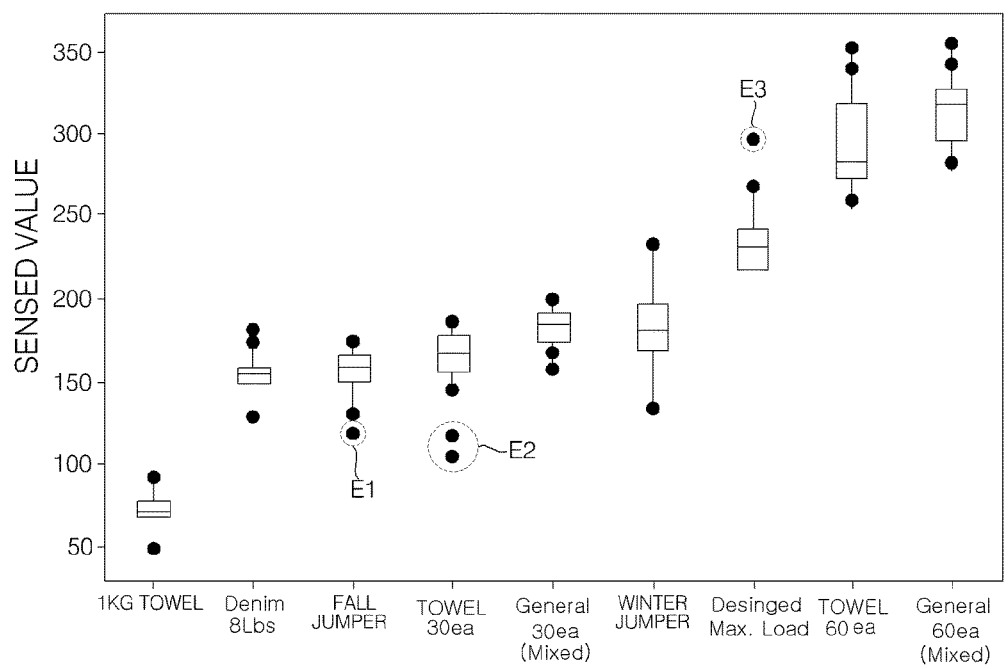

FIGS. 9 and 10 are views showing the results of measurement of the amount of laundry based on the kind of laundry in the washing machine according to the present disclosure. FIG. 9(a) is a view showing sensed values for respective kinds of laundry according to a conventional laundry amount determination method, and FIG. 9(b) is a view showing sensed values calculated from data sensed once when the amount of laundry is determined in accordance with the present disclosure. In addition, FIG. 10 is a view showing sensed values obtained through repetitive measurements, which are improved over those shown in FIG. 9(b).

As shown in FIG. 9(a), in the conventional washing machine, it is not possible to distinguish between an unloaded state and a T-shirt when determining the amount of laundry. In addition, the ranges of the sensed values of a fall jumper, a heavy towel, and a winter jumper overlap each other, and therefore it is difficult to distinguish therebetween. Furthermore, the distribution of the sensed values increases as the amount of laundry increases, whereby it is difficult to determine the amount of laundry.

In contrast, as shown in FIG. 9(b), in the washing machine according to the present disclosure, error depending on the characteristics of the motor is compensated for based on the current values in the maintenance period, the acceleration period, and the deceleration period, in consideration of the characteristics of gravity and inertia, and using the counter-electromotive force, whereby it is easier to distinguish between the sensed values based on the kinds of laundry.

If the amount of laundry is determined only once in accordance with the present disclosure, however, determination errors E1 and E2, in which some data deviates from the measured value, may be generated due to speed, unbalance, etc. In order to solve this problem, the rotational speed of the motor is repeated maintained, accelerated, and decelerated in the range from the second speed to the third speed a predetermined number of times, the laundry is dispersed if unbalance occurs, and the amount of laundry is sensed again. Consequently, error may be prevented, whereby it is possible to more precisely determine the amount of laundry.

In the present disclosure, therefore, the current of the motor at the time of starting the motor is not measured, but the current of the rotating motor in the maintenance period, in which the rotational speed of the motor is maintained, the acceleration period, and the deceleration period, and counter-electromotive force is calculated in order to determine the amount of laundry. Consequently, it is possible to exclude instability of the current at the time of starting the motor, to minimize variation due to the movement of the laundry, and to more precisely determine the amount of laundry using the characteristics of inertia. In addition, in the present disclosure, the amount of laundry is determined within the range from the rotational speed of the motor at which some of the laundry starts to cling to the drum to the rotational speed of the motor at which the laundry clings to the drum, whereby it is possible to minimize error due to the movement of the laundry and to improve accuracy through repeated determination.

As is apparent from the above description, in the washing machine according to the present disclosure and the method of controlling the same, the amount of laundry that is introduced into the washing machine is measured using gravity and inertia applied during the operation of the motor, whereby it is possible to precisely calculate the amount of laundry and to minimize the effects of the initial position of the laundry and the movement of the laundry. In addition, the current value of the motor that is operated is used to measure the amount of laundry without a sensor. Furthermore, the amount of laundry is measured at the rotational speed of the motor at which the laundry clings to the drum, whereby it is possible to minimize error due to the movement of the laundry to thus improve accuracy. Moreover, it is possible to determine the amount of laundry within a short time. Consequently, it is easy to commence the spin-drying operation, thereby reducing washing time and saving energy.

Therefore, the present disclosure has been made in view of the above problems, and it is an object of the present disclosure to provide a washing machine capable of rapidly and precisely determining the amount of laundry that is introduced thereinto, precisely measuring the amount of laundry even in the case in which the washing machine includes a sensorless motor, and easily performing a spin-drying operation based on the amount of laundry, thereby reducing washing time, and a method of controlling the same.

Aspects of the present disclosure provide a washing machine including a motor connected to a drum for rotating the drum, a motor-driving unit for supplying operating power to the motor to operate or stop the motor and to control the rotational speed of the motor, a current-sensing unit for measuring current of the motor during operation of the motor, and a controller for transmitting a control command for controlling the motor to the motor-driving unit in order to determine the amount of laundry contained in the drum and determining the amount of laundry based on a current value received from the current-sensing unit, wherein the motor-driving unit controls the motor such that the rotational speed of the motor is repeatedly maintained, accelerated, and decelerated within a predetermined range of speed in response to the control command, and the controller analyzes the current value received from the current-sensing unit on a per-period basis to calculate the amount of laundry within a range from a second speed, at which some of the laundry starts to cling to a wall of the drum, to a third speed, at which the laundry rotates along with the drum in a state of clinging to the wall of the drum.

In accordance with another aspect of the present disclosure, there is provided a method of controlling a washing machine that includes starting a motor in order to determine the amount of laundry contained in a drum, accelerating the motor to a second speed, at which some of the laundry starts to cling to a wall of the drum, controlling the rotational speed of the motor by maintaining, accelerating, and decelerating the rotational speed of the motor within a range from the second speed to a third speed, at which the laundry rotates along with the drum in the state of clinging to the wall of the drum, repeating the controlling the rotational speed of the motor a predetermined number of times, and analyzing, on a per-period basis, current values in a maintenance period, in which the rotational speed of the motor is maintained, an acceleration period, in which the rotational speed of the motor is accelerated, and a deceleration period, in which the rotational speed of the motor is decelerated, within a range from the second speed to the third speed, the current values being received from the current-sensing unit, to calculate the amount of laundry.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A washing machine comprising:
   a motor configured to rotate a drum;
   a power supply configured to provide operating power to the motor to selectively operate the motor and to control a rotational speed of the motor within a range between a first speed and a third speed;
   a current sensor configured to measure current of the motor during operation; and
   a controller configured to transmit a control command for controlling the motor to the power supply, and to determine an amount of laundry contained in the drum based on the current measured by the current sensor, wherein:
   when the power supply is configured to provide the operating power to the motor in response to the control command, the motor is configured to increase the rotational speed to the first speed, to maintain the rotational speed at the first speed for a particular amount of time, and to increase the rotational speed from the first speed to the second speed after the particular amount of time,
   the power supply is configured to control the motor such that the rotational speed of the motor is maintained at a second speed in a first maintenance period when the rotational speed of the motor reaches the second speed, the rotational speed of the motor accelerates from the second speed to the third speed in an acceleration period, the rotational speed of the motor is maintained at the third speed in a second maintenance period, and the rotational speed of the motor is decelerated from the third speed to the second speed in a deceleration period, and
   the controller is configured to cumulatively store data in each period, and to analyze respective currents measured by the current sensor during the acceleration period, the deceleration period, and the first and the second maintenance periods when the rotational speed of the motor is within a range from the second speed to the third speed.

2. The washing machine according to claim 1, wherein the power supply is configured to repeatedly increase, maintain, and decrease the rotational speed of the motor a particular number of times within the range from the second speed to the third speed.

3. The washing machine according to claim 1, wherein the controller is configured to
   calculate an average of currents, measured in the maintenance periods,
   subtract data of at least one of the maintenance periods from data of the acceleration period in which the rotational speed of the motor is increased from the second speed to the third speed to determine a first value, and
   multiply the first value by a counter-electromotive force calculated in a deceleration period in which the rotational speed of the motor is decreased from the third speed to the second speed to calculate a laundry-amount sensing value used for determining the amount of laundry in the drum.

4. The washing machine according to claim 3, wherein the controller is further configured to calculate an average of currents measured in the first maintenance period and the second maintenance period, and to calculate an average of currents measured in the acceleration period to determine the amount of laundry.

5. The washing machine according to claim 1, wherein the controller is configured to identify an unbalance during the maintenance period in which the motor is rotated at the third speed for the amount of time, and
   wherein, when the identified unbalance is equal to or greater than a particular level, the motor is configured to decelerate from the third speed to the first speed and to maintain at the first speed to disperse laundry.

6. The washing machine according to claim 1, wherein the controller is configured to analyze respective currents measured by the current sensor during periods when the rotational speed of the motor is within the range from the second speed to the third speed, the second speed is set such that some of the laundry starts to cling to a wall of the drum, and the third speed is set such that the laundry rotates along with the drum to cling to the wall of the drum.

7. The washing machine according to claim 6, wherein the controller is configured to set a rotational speed of the motor at which the laundry tumbles in the drum as the first speed.

8. The washing machine according to claim 1, wherein the controller is configured to determine the amount of laundry based on a gravitational force applied to the laundry during the maintenance period in which the rotational speed of the motor is maintained, inertia applied to the laundry during the acceleration period in which the rotational speed of the motor is increased, and counter-electromotive force during the deceleration period in which the rotational speed of the motor is decreased.

9. The washing machine according to claim 8, wherein the controller is configured to exclude data in the maintenance period, from data in the acceleration period and the deceleration period, to extract data on the inertia in the acceleration period and the deceleration period, and to compensate for characteristics of the motor through the counter-electromotive force in the deceleration period to determine the amount of laundry.

10. The washing machine according to claim 8, wherein
the controller is configured to determine the amount of laundry by applying different data to respective laundry-amount sensing values calculated in the acceleration period and the maintenance period, and the controller is configured to determine the amount of laundry by combining the laundry-amount sensing value in the acceleration period with the laundry-amount sensing value in the maintenance period.

11. The washing machine according to claim 1, wherein the rotational speed of the motor is varied in a repeated process in which the rotational speed is increased to the third speed, then maintained at the third speed, and then decreased from the third speed.

12. The washing machine according to claim 11, wherein the repeated process is ended after the rotational speed is maintained at and then decreased from the third speed a particular number of times.

13. The washing machine according to claim 11, wherein the repeated process is ended after the rotational speed decreased from the third speed to the second speed a particular number of times.

14. The washing machine according to claim 1, wherein the motor is configured to decelerate from the third speed to the first speed to disperse laundry when an unbalance does not occur during the amount of time the motor is maintained at the third speed.

15. The washing machine according to claim 1, wherein the drum is configured to receive laundry via an opening on a front surface of the washing machine.

16. The washing machine according to claim 1, wherein the controller is further configured to manage a rotational speed of the drum during a spin-drying operation based on the amount of laundry contained in the drum.

17. The washing machine according to claim 16, wherein the controller is further configured to determine a maximum rotational speed of the drum during the spin-drying operation based on the amount of laundry contained in the drum.

18. The washing machine according to claim 5, wherein, when the identified unbalance is less than particular level, the motor is configured to decelerate from the third speed to the second speed.

19. A washing machine comprising:
a motor configured to rotate a drum;
a power supply configured to provide operating power to the motor to selectively operate the motor and to control a rotational speed of the motor within a range between a first speed and a third speed;
a current sensor configured to measure current of the motor during operation; and
a controller configured to transmit a control command for controlling the motor to the power supply, and to determine an amount of laundry contained in the drum based on the current measured by the current sensor,
wherein:
the power supply is configured to control the motor such that the rotational speed of the motor is maintained at a second speed in a first maintenance period when the rotational speed of the motor reaches the second speed, the rotational speed of the motor accelerates from the second speed to the third speed in an acceleration period, the rotational speed of the motor is maintained at the third speed in a second maintenance period, and the rotational speed of the motor is decelerated from the third speed to the second speed in a deceleration period,
the controller is configured to cumulatively store data in each period, and to analyze respective currents measured by the current sensor during the acceleration period, the deceleration period, and the first and the second maintenance periods when the rotational speed of the motor is within a range from the second speed to the third speed,
the controller is configured to identify an unbalance during the maintenance period in which the motor is rotated at the third speed for the amount of time, and
when the identified unbalance is equal to or greater than a particular level, the motor is configured to decelerate from the third speed to the first speed and to maintain at the first speed to disperse laundry.

20. A washing machine comprising:
a motor configured to rotate a drum;
a power supply configured to provide operating power to the motor to selectively operate the motor and to control a rotational speed of the motor within a range between a first speed and a third speed;
a current sensor configured to measure current of the motor during operation; and
a controller configured to transmit a control command for controlling the motor to the power supply, and to determine an amount of laundry contained in the drum based on the current measured by the current sensor,
wherein:
the power supply is configured to control the motor such that the rotational speed of the motor is maintained at a second speed in a first maintenance period when the rotational speed of the motor reaches the second speed, the rotational speed of the motor accelerates from the second speed to the third speed in an acceleration period, the rotational speed of the motor is maintained at the third speed in a second maintenance period, and the rotational speed of the motor is decelerated from the third speed to the second speed in a deceleration period, the controller is configured to cumulatively store data in each period, and to analyze respective currents measured by the current sensor during the acceleration period, the deceleration period, and the first and the second maintenance periods when the rotational speed of the motor is within a range from the second speed to the third speed, the controller is configured to determine the amount of laundry based on a gravitational force applied to the laundry during the maintenance period in which the rotational speed of the motor is maintained, inertia applied to the laundry during the acceleration period in which the rotational speed of the motor is increased, and counter-electromotive force during the deceleration period in which the rotational speed of the motor is decreased, and the controller is configured to exclude data in the maintenance period from data in the acceleration period and the deceleration period, to extract data on the inertia in the acceleration period and the deceleration period, and to compensate for characteristics of the motor through the counter-electromotive force in the deceleration period to determine the amount of laundry.

* * * * *